US012795634B2

(12) United States Patent
Luo

(10) Patent No.: US 12,795,634 B2
(45) Date of Patent: Nov. 10, 2026

(54) BEAM SWITCHING, ASSESSING AND REPORTING METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Xingyi Luo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 330 days.

(21) Appl. No.: 18/695,924

(22) PCT Filed: Sep. 29, 2021

(86) PCT No.: PCT/CN2021/121918

§ 371 (c)(1),
(2) Date: Mar. 27, 2024

(87) PCT Pub. No.: WO2023/050208

PCT Pub. Date: Apr. 6, 2023

(65) Prior Publication Data

US 2024/0389087 A1 Nov. 21, 2024

(51) Int. Cl.
*H04W 72/044* (2023.01)
*H04W 16/28* (2009.01)
*H04W 72/232* (2023.01)

(52) U.S. Cl.
CPC ........ *H04W 72/046* (2013.01); *H04W 72/232* (2023.01)

(58) Field of Classification Search
CPC ............. H04W 72/046; H04W 72/232; H04W 74/0808; H04W 16/28; H04B 7/06952
See application file for complete search history.

(56) References Cited

U.S. PATENT DOCUMENTS

2020/0313831 A1 10/2020 Kim et al.
2021/0259014 A1* 8/2021 Falahati ............ H04W 72/1268
2022/0224476 A1* 7/2022 Noh ...................... H04L 5/0051

FOREIGN PATENT DOCUMENTS

CN 105101291 A 11/2015
CN 107733473 A 2/2018
CN 109155652 A 1/2019
(Continued)

OTHER PUBLICATIONS

"R4-2107681 [99-e][155] LTE_Baskets, final report", 3GPP tsg_ran\\wg4_radio, (May 28, 2021).
(Continued)

*Primary Examiner* — Said M Elnoubi
(74) *Attorney, Agent, or Firm* — Volpe Koenig

(57) ABSTRACT

A beam switching method, apparatus and computer readable medium that improve the efficiency of a wireless communication network. The efficiency is improved by: sending, in a case of communicating with a terminal through a first beam and needing to switch to a second beam, indication information to the terminal for indicating the terminal to assess a channel corresponding to the second beam; receiving an assessment result, reported by the terminal, for the channel corresponding to the second beam; and determining, according to the assessment result, whether to switch to the second beam to communicate, through the second beam, with the terminal.

16 Claims, 8 Drawing Sheets

(56) References Cited

FOREIGN PATENT DOCUMENTS

| | | | | | |
|---|---|---|---|---|---|
| CN | 109196815 | A | * | 1/2019 | ........ H04W 74/0808 |
| CN | 109392005 | A | | 2/2019 | |
| CN | 109526058 | A | | 3/2019 | |
| CN | 110582956 | A | | 12/2019 | |
| CN | 110603742 | A | | 12/2019 | |
| CN | 111432492 | A | | 7/2020 | |
| CN | 111836303 | A | | 10/2020 | |
| CN | 113037348 | A | | 6/2021 | |
| CN | 113141617 | A | | 7/2021 | |
| CN | 113196684 | A | | 7/2021 | |
| CN | 113228552 | A | | 8/2021 | |
| JP | 2003-298483 | A | | 10/2003 | |
| KR | 20200016180 | A | | 2/2020 | |
| WO | 2018/059128 | A1 | | 4/2018 | |
| WO | 2020/220871 | A1 | | 11/2020 | |
| WO | 2021/147641 | A1 | | 7/2021 | |

OTHER PUBLICATIONS

Ling Qidong; Zhang Lei; Wang Honglei; Wang Bo;, "LTE-R Fast Handover Algorithm in High-Speed Rail Environment", Computer Engineering and Design, (Nov. 16, 2018), No. 11.

* cited by examiner

BEAM SWITCHING, ASSESSING AND REPORTING METHOD AND APPARATUS, COMMUNICATION DEVICE, AND STORAGE MEDIUM

CROSS-REFERENCE TO RELATED APPLICATION

The present application is a U.S. National Stage of International Application No. PCT/CN2021/121918, filed on Sep. 29, 2021, the contents of all of which are incorporated herein by reference in their entireties for all purposes.

BACKGROUND OF THE INVENTION

During communication between a base station and a terminal through beams, when the base station determines that a channel C1 corresponding to a beam beam1 is clear (namely unoccupied) through listen before talk (LBT), the base station may occupy the channel C1 and communicate with the terminal through the beam beam1.

SUMMARY OF THE INVENTION

The disclosure relates to the field of communication technology, in particular to a beam switching method, an assessing and reporting method, a beam switching apparatus, an assessing and reporting apparatus, a communication device, and a computer-readable storage medium.

According to a first aspect of the examples of the disclosure, a beam switching method is provided. The beam switching method is executed by a base station. The beam switching method includes: sending, in a case of communicating with a terminal through a first beam and needing to switch to a second beam, first indication information to the terminal for indicating the terminal to assess a channel corresponding to the second beam; receiving an assessment result, reported by the terminal, for the channel corresponding to the second beam; and determining, according to the assessment result, whether to switch to the second beam to communicate, through the second beam, with the terminal.

According to a second aspect of the examples of the disclosure, an assessing and reporting method is provided. The assessing and reporting method is executed by a terminal. The assessing and reporting method includes: receiving, in a case of communicating with a base station through a first beam, first indication information sent by the base station, the first indication information being used for indicating the terminal to assess a channel corresponding to a second beam; assessing the channel corresponding to the second beam; and reporting an assessment result, obtained by assessing the channel corresponding to the second beam, to the base station.

According to a third aspect of the examples of the disclosure, a beam switching apparatus is provided. The beam switching apparatus includes one or more processors. The one or more processors are collectively configured to: send, in a case of communicating with a terminal through a first beam and needing to switch to a second beam, first indication information to the terminal for indicating the terminal to assess a channel corresponding to the second beam; receive an assessment result, reported by the terminal, for the channel corresponding to the second beam; and determine, according to the assessment result, whether to switch to the second beam to communicate, through the second beam, with the terminal.

According to a fourth aspect of the examples of the disclosure, an assessing and reporting apparatus is provided. The assessing and reporting apparatus includes one or more processors. The one or more processor are collectively configured to: receive, in a case of communicating with a base station through a first beam, first indication information sent by the base station, the first indication information being used for indicating the terminal to assess a channel corresponding to a second beam; assess the channel corresponding to the second beam; and report an assessment result, obtained by assessing the channel corresponding to the second beam, to the base station.

According to a fifth aspect of the examples of the disclosure, a communication device is provided. The communication device includes: one or more processors; and a memory configured to store processor-executable instructions. The one or more processors are collectively configured to execute the above beam switching method.

According to a sixth aspect of the examples of the disclosure, a communication device is provided. The communication device includes: one or more processors; and a memory configured to store processor-executable instructions. The one or more processors are collectively configured to execute the above assessing and reporting method.

According to a seventh aspect of the examples of the disclosure, a non-transitory computer-readable storage medium is provided and configured to store a computer program. The computer program, when collectively executed by one or more processors, implements steps in the above beam switching method.

According an eighth aspect of the examples of the disclosure, a non-transitory computer-readable storage medium is provided and configured to store a computer program. The computer program, when collectively executed by one or more processors, implements steps in the above assessing and reporting method.

BRIEF DESCRIPTION OF DRAWINGS

In order to more clearly explain technical solutions in examples of the disclosure, the following will briefly introduce accompanying drawings needed to be used in the description of the examples. The accompanying drawings in the following description are some examples of the disclosure. For those ordinary skilled in the art, other accompanying drawings can further be obtained according to these accompanying drawings without paying creative labor.

DETAILED DESCRIPTION OF THE INVENTION

Figure 1:
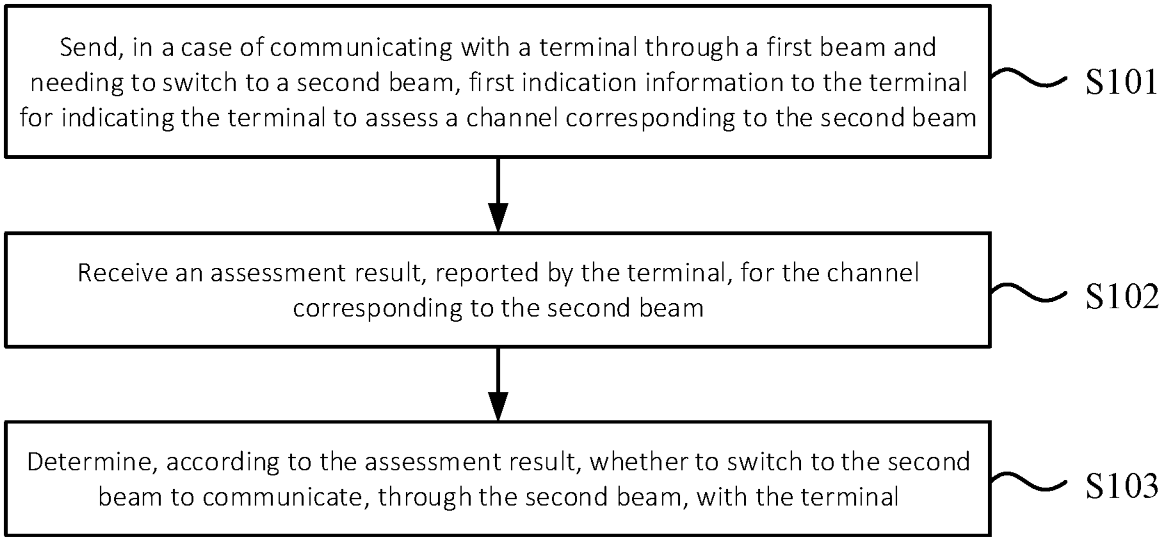
FIG. 1 is a schematic flow chart of a beam switching method according to an example of the disclosure.

The technical solutions in the examples of the disclosure will be clearly and completely described below in conjunction with accompanying drawings in examples of the disclosure. The described examples are a part of the examples of the disclosure, not all of the examples. Based on the examples in the disclosure, all other examples obtained by those ordinary skilled in the art without creative labor fall within the protection scope of the disclosure.

The terms used in the examples of the disclosure are for the purpose of describing the examples, and not intended to limit the examples of the disclosure. The singular forms "one" and "the" used in the examples of the disclosure and the appended claims are also intended to include the plural forms unless the context clearly indicates other meanings. It is to be further understood that the term "and/or" used indicates and includes any or all possible combinations of one or more associated listed items.

It is to be understood that although the terms first, second, third, etc. may be used to describe various information in the examples of the disclosure, such information will not be limited to these terms. These terms are used to distinguish the same type of information from each other. For example, without departing from the scope of the examples of the disclosure, a first beam may also be referred to as a second beam, and similarly, the second beam may also be referred to as the first beam. Depending on the context, for example, the word "if" used may be interpreted as "while," "when," or "in response to determining."

For the purpose of brevity and easy understanding, the terms used in this text when representing a size relationship are "greater than," "smaller than," and "higher than," or "lower than." However, for those skilled in the art, it can be understood that the term "greater than" also covers the meaning of "greater than or equal to," and "smaller than" also covers the meaning of "smaller than or equal to," and the term "higher than" also covers the meaning of "higher than or equal to", and "lower than" also covers the meaning of "lower than or equal to".

During communication between a base station and a terminal through beams, when the base station determines that a channel C1 corresponding to a beam beam1 is clear (namely unoccupied) through listen before talk (LBT), the base station may occupy the channel C1 and communicate with the terminal through the beam beam1.

During communication with the terminal through the beam1, the base station may need to perform beam switching. For example, the base station may need to switch to beam2 to communicate with the terminal. However, the conditions of channels corresponding to different beams may be different. For example, in a case where the channel C1 and a channel C2 belong to an unlicensed frequency band, the base station merely determines that the channel C1 corresponding to the beam beam1 is clear, and cannot determine whether the channel C2 corresponding to the beam beam2 is clear. If the terminal is hastily indicated to switch to the beam beam2 for communication, it may cause problems due to the channel C2 being busy.

FIG. 1 is a schematic flow chart of a beam switching method according to an example of the disclosure. The beam switching method shown in this example may be executed by a base station. The base station may communicate with a terminal. The terminal includes, but is not limited to a mobile phone, a tablet, a wearable device, a sensor, an Internet of Things device, and other communication devices. The base station includes, but is not limited to, base stations in communication systems, such as 4G, 5G, and 6G.

In an example, the base station may communicate with the terminal through a beam. A frequency band corresponding to a beam may include a licensed frequency band, and may also include an unlicensed frequency band. The following examples provide an illustrative description of the technical solutions of the disclosure for a scenario of communication between the base station and the terminal through a beam corresponding to the unlicensed frequency band. As shown in FIG. 1, the beam switching method may include steps S101 to S103.

Step S101 includes sending, in a case of communicating with a terminal through a first beam and needing to switch to a second beam, first indication information to the terminal for indicating the terminal to assess a channel corresponding to the second beam.

Step S102 includes receiving an assessment result, reported by the terminal, for the channel corresponding to the second beam.

Step S103 includes determining, according to the assessment result, whether to switch to the second beam to communicate, through the second beam, with the terminal.

In an example, the base station may need to perform beam switching during communicating with the terminal through the first beam, such as switching to the second beam for communication. The first beam corresponds to a channel C1, the second beam corresponds to a channel C2, and the channel C1 and the channel C2 may belong to an unlicensed frequency band.

Since the base station may use a beam for communication merely after determining that a channel corresponding to the beam is clear, the base station has been determined that a channel corresponding to the first beam is not occupied when the base station is communicating with the terminal by using the first beam. Thus, the first indication information may be sent to the terminal through the first beam for indicating to the terminal to assess the channel corresponding to the second beam.

As a receiver, the terminal may assess the channel corresponding to the second beam after receiving the first indication information sent by the base station. The assessment way for the channel corresponding to the second beam is explained in subsequent examples. After assessing the channel corresponding to the second beam, the terminal may report the assessment result to the base station, such as reporting the assessment result to the base station through the first beam.

The base station may determine, according to the assessment result, whether to switch to the second beam to communicate with the terminal through the second beam. For example, the base station may determine, according to the assessment result, whether the channel C2 corresponding to the second beam is occupied. In a case that the channel C2 is not occupied, that is, the channel C2 is clear, the base station may indicate the terminal to switch to the second beam for communication. In a case that the channel C2 is occupied, the base station may communicate with the terminal by continuing using the first beam.

It is to be noted that, the second beam may be one beam, or a plurality of beams. The base station may indicate the terminal to assess a channel corresponding to one beam, or indicate the terminal to assess channels corresponding to the plurality of beams.

For example, in a case that the terminal is indicated to assess a channel corresponding to one second beam, the terminal may report an assessment result for the channel corresponding to this second beam. In a case of determining that the channel is clear according to the assessment result, the base station may indicate to the terminal to switch to this second beam. In a case of determining that the channel is occupied according to the assessment result, the base station does not need to indicate to the terminal to switch to the second beam, but communicates with the terminal by continuing using the first beam.

For example, in a case that the terminal is indicated to assess channels corresponding to a plurality of second beams, the terminal may report assessment results for the channels corresponding to the plurality of second beams, and may further mark the beam corresponding to each assessment result. In a case of determining that at least one of the channels is clear according to the plurality of assessment results, the base station may indicate the terminal to switch to a second beam corresponding to the clear channel. For example, the base station selects a second beam corresponding to one of the plurality of clear channels according to actual situations and indicates the selected second beam to the terminal. In a case of determining that the channels corresponding to all the second beams are occupied according to the assessment results, the base station does not need to indicate to the terminal to switch to the second beam, but communicates with the terminal by continuing using the first beam.

In an example, the first indication information is further used for indicating that a beam corresponding to a to-be-assessed channel is the second beam, and/or the method further includes: sending second indication information to the terminal for indicating that the beam corresponding to the to-be-assessed channel is the second beam.

In an example, the base station may trigger, through the first indication information, the terminal to execute an assessment operation, but the channels corresponding to which second beams need to be assessed also need to be indicated by the base station. For example, the base station may trigger, through the first indication information, the terminal to execute the assessment operation, and also indicate, through the first indication information, to the terminal that the beam corresponding to the to-be-assessed channel is the second beam. Alternatively, the base station may trigger, through the first indication information, the terminal to execute the assessment operation, and indicate, through the second indication information, to the terminal that the beam corresponding to the to-be-assessed channel is the second beam.

In an example, the first indication information includes downlink control information (DCI). The second indication information includes at least one of: radio resource control (RRC) signaling, or media access control (MAC) signaling.

In a case of indicating, through the DCI, the terminal that the beam corresponding to the to-be-assessed channel is the second beam, one or more bits in the DCI may be set for indicating a sensing beam that needs to be assessed by the terminal, and the indicated sensing beam is the to-be-assessed second beam. The number of the bits for indicating may be related to the number of candidate beams (which may be pre-agreed). For example, there are four candidate beams, the base station selects one or more of the four candidate beams as the sensing beams, so indication may be performed through two bits to indicate the terminal to assess channels corresponding to the sensing beams. For example, if there are two candidate beams, the base station selects one or more of the two candidate beams as the second beam, so an indication may be performed through one bit to indicate the terminal to assess the channel corresponding to the second beam.

In a case of the second indication information being the RRC signaling, there may be an aperiodic trigger state field in the RRC signaling. A beam corresponding to a channel that needs to be assessed by the terminal may be indicated through a quasi co-location (QCL) parameter in this field. In a case of the second indication information being the MAC signaling, a beam corresponding to a channel that needs to be assessed by the terminal may be indicated through an MAC CE (information element). The number of bits that need to be occupied by the indication information in these two cases is similar to the above examples, so it will not be repeated.

Furthermore, it may further be indicated, through a combination of the first indication information and the second indication information, that the beam corresponding to the to-be-assessed channel is the second beam. For example, the RRC signaling and the DCI are combined to indicate to the terminal that the beam corresponding to the to-be-assessed channel is the second beam. Alternatively, the MAC signaling and the DCI are combined to indicate the terminal that the beam corresponding to the to-be-assessed channel is the second beam. For example, the terminal is first informed of candidate beams or candidate beam combinations through the RRC signaling or the MAC signaling, and then is informed, through the DCI, that a beam or a beam combination in the candidate beams or the candidate beam combinations is the second beam corresponding to the to-be-assessed channel by the terminal.

In an example, channel occupied time (COT) of the base station on the channel corresponding to the first beam may be COT1.

In a case of communicating with the terminal by continuing using the first beam, the base station may continue to occupy the channel corresponding to the first beam until COT1 ends.

In a case of switching to the second beam to communicate with the terminal through the second beam, the base station may re-determine a channel occupied time for the channel C2 corresponding to the second beam, such as COT2, so as to occupy the channel C2 corresponding to the second beam until the COT2 ends. Alternatively, the base station may continue to perform occupancy according to COT1, that is, a sum of an occupied duration for the channel C1 corresponding to the first beam before beam switching and an occupied duration for the channel C2 corresponding to the second beam after beam switching is the COT1.

According to the examples of the disclosure, in a case of communicating with the terminal through the first beam and needing to switch to the second beam, the base station can send the indication information to the terminal for indicating the terminal to assess the channel corresponding to the second beam, and the assessment result may be reported, so that whether to switch to the second beam to communicate with the terminal may be determined according to the assessment result, thus facilitating avoidance of a communication problem caused by switching, in a case that the channel corresponding to the second beam is occupied, to the second beam.

In an example, a way of assessing the channel corresponding to the second beam includes at least one of: measuring layer 1-received signal strength indication (L1-RSSI) of the channel corresponding to the second beam; or performing clear channel assessment (CCA) or enhance clear channel assessment (eCCA) on the channel corresponding to the second beam, where "e" represents enhance.

As a receiver communicating at the unlicensed frequency band, the terminal may assess an occupancy situation of the channel corresponding to the second beam that needs to be switched to by measuring the L1-RSSI of the channel corresponding to the second beam, or by performing the CCA or the eCCA on the channel corresponding to the second beam. The following examples mainly provide illustrative explanations for these two ways.

Figure 2:
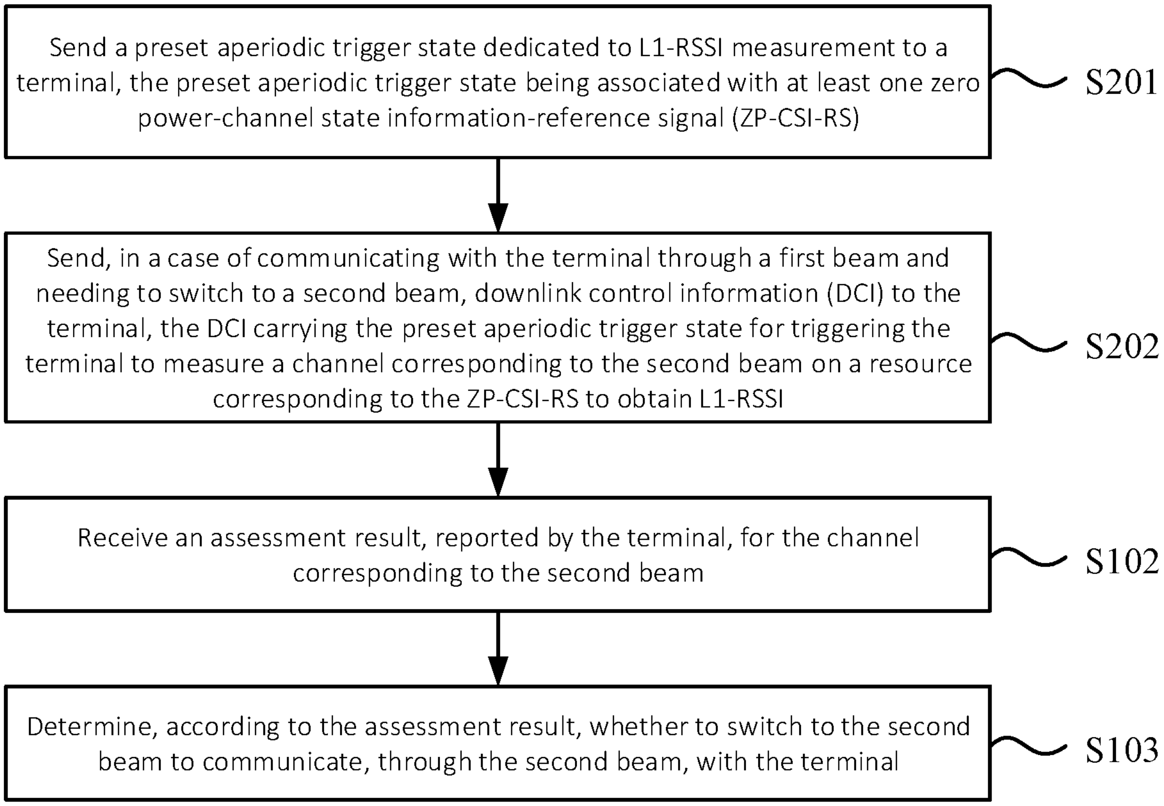
FIG. 2 is a schematic flow chart of another beam switching method according to an example of the disclosure.

FIG. 2 is a schematic flow chart of another beam switching method according to an example of the disclosure. As shown in FIG. 2, the way of assessing the channel corresponding to the second beam includes measuring the L1-RSSI of the channel corresponding to the second beam. The beam switching method further includes step S201.

Step S201 includes sending to the terminal a preset aperiodic trigger state dedicated to L1-RSSI measurement. The preset aperiodic trigger state is associated with at least one zero power-channel state information-reference signal (ZP-CSI-RS).

Sending the first indication information to the terminal includes step S202.

Step S202 includes sending downlink control information (DCI) to the terminal, the DCI carrying the preset aperiodic trigger state for triggering the terminal to measure the channel corresponding to the second beam on a resource corresponding to the ZP-CSI-RS to obtain the L1-RSSI.

In an example, the base station may send the preset aperiodic trigger state to the terminal in advance, and the preset aperiodic trigger state is dedicated to the L1-RSSI, for example, the preset aperiodic trigger state may be sent to the terminal through the RRC signaling, and the preset aperiodic trigger state is associated with at least one ZP-CSI-RS.

Thus, in a case of needing to perform beam switching, DCI may be sent to the terminal, and the preset aperiodic trigger state may be carried in the DCI. After receiving the DCI, the terminal may detect a CSI request field in the DCI, in which the aperiodic trigger state is carried. In a case that the aperiodic trigger state in the CSI request field is the preset aperiodic trigger state, the terminal may be triggered to measure the L1-RSSI of the channel corresponding to the second beam on the resource corresponding to the ZP-CSI-RS associated with the preset aperiodic trigger state.

In an example, the DCI includes uplink scheduling DCI.

The uplink scheduling DCI is further used for indicating the terminal to report the assessment result through a physical uplink shared channel (PUSCH) scheduled by the uplink scheduling DCI.

In an example, the type of the DCI may be DCI format 0_1 or DCI format 0_2, the two types of DCI are uplink scheduling DCI. After obtaining the L1-RSSI by assessing, the terminal may report the L1-RSSI to the base station on an uplink resource scheduled by the DCI. Based on this, the DCI can not only play a role of indication, but also play a role of scheduling, which is conducive to improving the communication efficiency.

Figure 3:
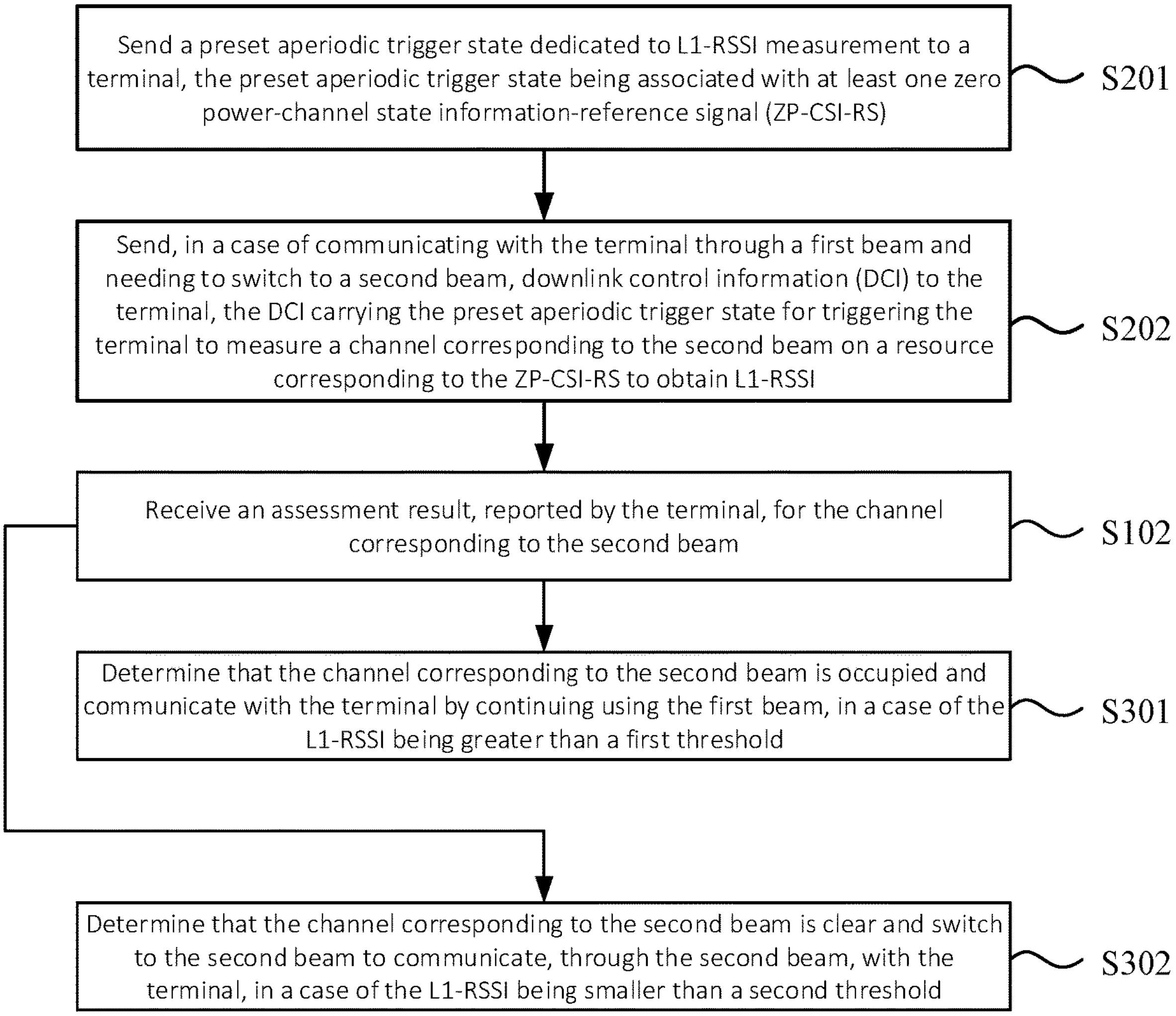
FIG. 3 is a schematic flow chart of yet another beam switching method according to an example of the disclosure.

FIG. 3 is a schematic flow chart of yet another beam switching method according to an example of the disclosure. As shown in FIG. 3, determining, according to the assessment result, whether to switch to the second beam to communicate, through the second beam, with the terminal includes steps S301 and S302.

Step S301 includes determining that the channel corresponding to the second beam is occupied and communicating with the terminal by continuing using the first beam, in a case of the L1-RSSI being greater than a first threshold.

Step S302 includes determining that the channel corresponding to the second beam is clear and switching to the second beam to communicate, through the second beam, with the terminal, in a case of the L1-RSSI being smaller than a second threshold.

In an example, after receiving the L1-RSSI reported by the terminal, the base station may determine whether the channel corresponding to the second beam is clear based on the L1-RSSI.

In a case of the L1-RSSI being large, such as being greater than the first threshold, it may be determined that the channel corresponding to the second beam is occupied, and a communication problem may be caused by switching to the second beam, so that the base station may communicate with the terminal by continuing using the first beam.

In a case of the L1-RSSI being small, such as being smaller than the second threshold, it may be determined that the channel corresponding to the second beam is clear, and the second beam may be switched to for communicating, through the second beam, with the terminal, so the terminal may be indicated to perform beam switching to switch to the second beam for communication. The first threshold and the second threshold may be set as needed, and the second threshold is smaller than or equal to the first threshold.

Figure 4:
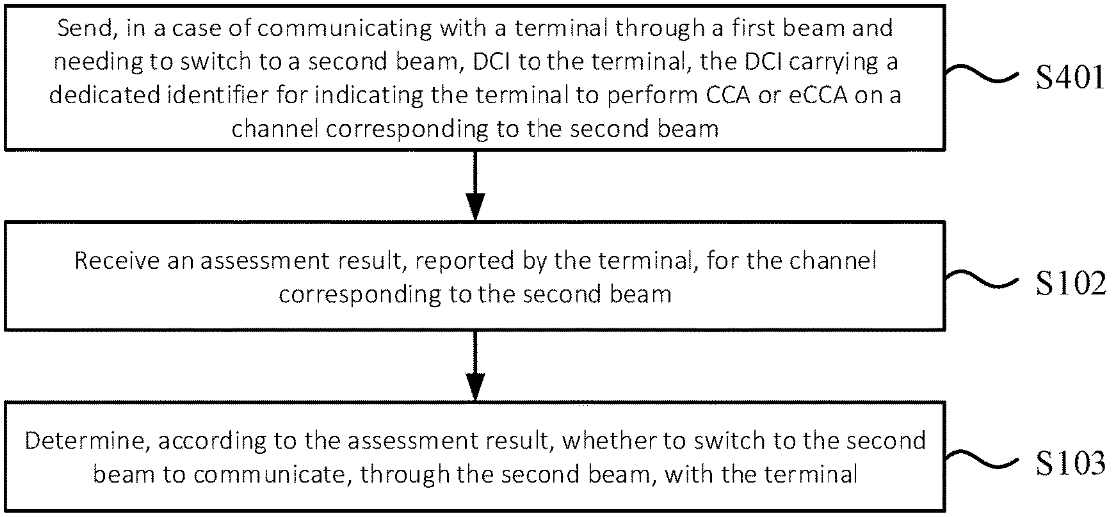
FIG. 4 is a schematic flow chart of yet another beam switching method according to an example of the disclosure.

FIG. 4 is a schematic flow chart of yet another beam switching method according to an example of the disclosure. As shown in FIG. 4, the way of assessing the channel corresponding to the second beam includes performing the CCA or the eCCA on the channel corresponding to the second beam. In this case, sending the first indication information to the terminal includes step S401.

Step S401 includes sending DCI to the terminal. The DCI carries a dedicated identifier that indicates the terminal to perform the CCA or the eCCA on the channel corresponding to the second beam.

In an example, the base station sends the DCI carrying the dedicated identifier to the terminal to instruct the terminal to perform the CCA or the eCCA on the channel corresponding to the second beam.

The base station may send a plurality of pieces of DCI to the terminal during communication with the terminal. Different pieces of DCI may have different roles. For example, the base station may send the DCI to the terminal for routine scheduling. Alternatively, the base station may send the DCI to the terminal to indicate COT for the channel corresponding to the first beam. Thus, in order to indicate, through the DCI, the terminal to perform the CCA or the eCCA on the channel corresponding to the second beam, the dedicated identifier may be added into the DCI. After receiving the DCI, the terminal may determine, in a case of determining that there is the dedicated identifier in the DCI, that the DCI is at least used for indicating the terminal to perform the CCA or the eCCA on the channel corresponding to the second beam.

In an example, the DCI includes at least one of the uplink scheduling DCI or the downlink scheduling DCI.

The uplink scheduling DCI is further used for indicating the terminal to report the assessment result through a PUSCH scheduled by the uplink scheduling DCI.

The downlink scheduling DCI is further used for instructing the terminal to report the assessment result through a physical uplink control channel (PUCCH) corresponding to a hybrid automatic repeat request (HARQ), where the HARQ corresponds to a physical downlink shared channel (PDSCH) scheduled by the downlink scheduling DCI.

In an example, the DCI may be the downlink scheduling DCI, or the uplink scheduling DCI.

Taking the uplink scheduling DCI as an example, after obtaining the assessment result by performing the CCA or the eCCA on the channel corresponding to the second beam, the terminal may report a result of the CCA or the eCCA to the base station on an uplink resource scheduled by the DCI.

Taking the downlink scheduling DCI as an example, after obtaining the assessment result by performing the CCA or the eCCA on the channel corresponding to the second beam, the terminal may determine the PDSCH scheduled by the DCI so as to determine the PUCCH for transmitting the HARQ corresponding to the PDSCH, so that the result of the CCA or the eCCA may be reported to the base station on the determined PUCCH.

Figure 5:
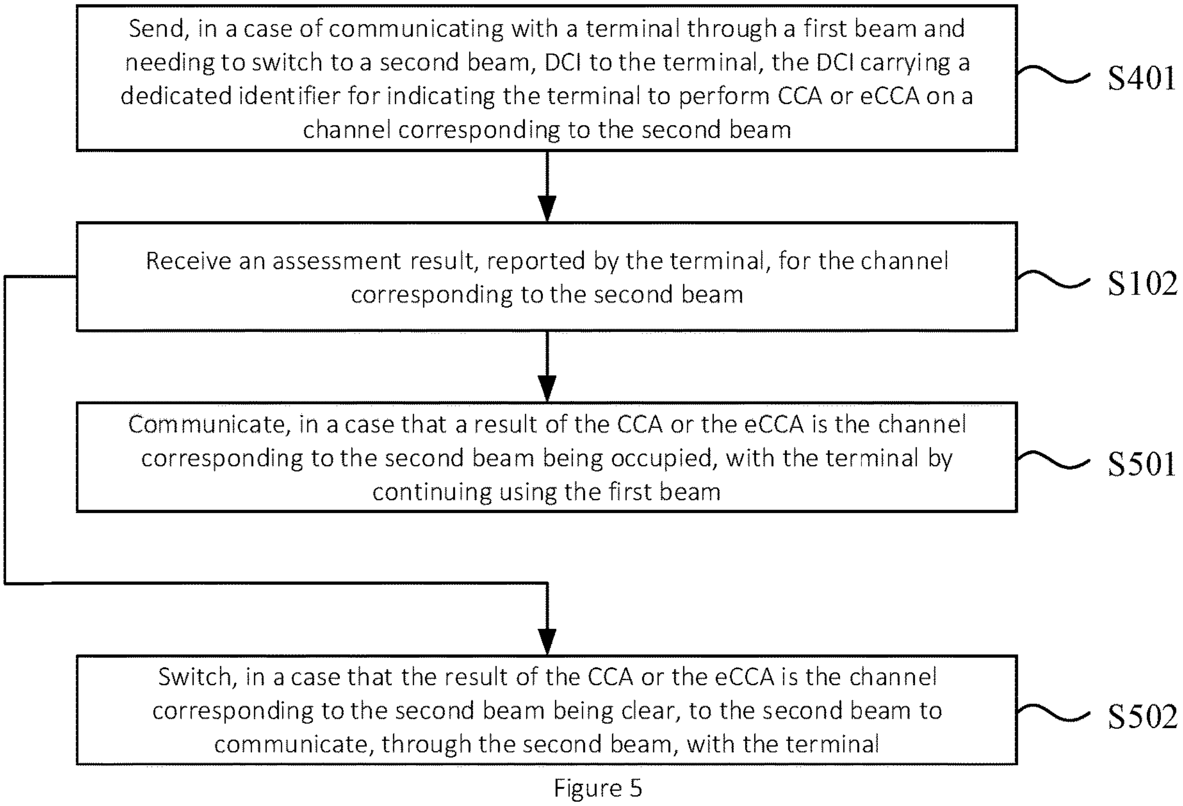
FIG. 5 is a schematic flow chart of yet another beam switching method according to an example of the disclosure.

FIG. 5 is a schematic flow chart of yet another beam switching method according to an example of the disclosure. As shown in FIG. 5, determining, according to the assessment result, whether to switch to the second beam to communicate, through the second beam, with the terminal includes steps S501 and S502.

Step S501 includes communicating, in a case that the result of the CCA or the eCCA is the channel corresponding to the second beam being occupied, with the terminal by continuing using the first beam.

Step S502 includes switching, in a case that the result of the CCA or the eCCA is the channel corresponding to the second beam being clear, to the second beam to communicate, through the second beam, with the terminal.

In an example, after receiving the result of the CCA or the eCCA reported by the terminal, the base station may determine whether the channel corresponding to the second beam is clear based on the result of the CCA or the eCCA.

The result of the CCA or the eCCA may be reported in a form of auxiliary information, such as occupying 1 bit. In a case that this bit is 0, it represents that the channel corresponding to the second beam is occupied. In a case that this bit is 1, it represents that the channel corresponding to the second beam is clear. So, in a case of determining that the channel corresponding to the second beam is occupied, the communication problem may be caused by switching to the second beam, so that it may communicate with the terminal by continuing using the first beam. In a case of determining that the channel corresponding to the second beam is clear, it may be switched to the second beam to communicate with the terminal through the second beam, so that the terminal may be indicated to perform beam switching to switch to the second beam for communication.

Figure 6:
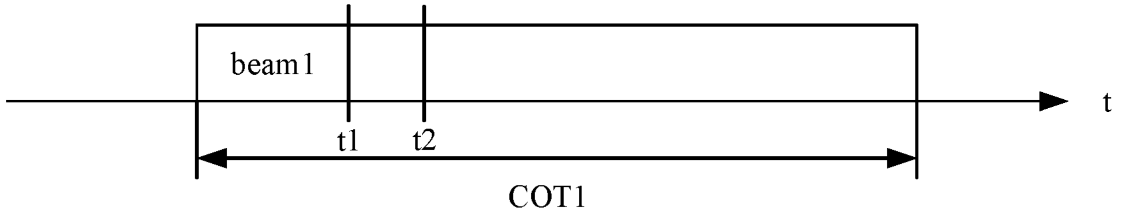
FIG. 6 is a schematic timing diagram of indication information and an assessment result according to an example of the disclosure.

FIG. 6 is a schematic timing diagram of indication information and an assessment result according to an example of the disclosure.

As shown in FIG. 6, a base station is communicating with a terminal through a first beam beam1, for example, the first beam beam1 corresponds to a channel C1, occupied time for the channel C1 is COT1. In a case of needing to perform beam switching, such as needing to switch to a second beam beam2, corresponding to a moment t1 shown in FIG. 6, first indication information may be sent to the terminal, for triggering the terminal to assess a channel C2 corresponding to the second beam beam2.

After receiving the first indication information, the terminal may assess the channel corresponding to the second beam and report an assessment result to the base station, such as reporting at a moment t2 shown in FIG. 6.

After receiving the assessment result, the base station may determine whether the channel C2 is clear according to the assessment result. In a case of determining that the channel C2 is clear, the base station may indicate the terminal to perform beam switching to switch to the second beam beam2 for communication. In a case of determining that the channel C2 is occupied, the base station does not need to indicate the terminal to perform beam switching, but continues to communicate through the first beam beam1.

In a case of communicating with the terminal by continuing using the first beam, the base station may continue to occupy the channel C1 corresponding to the first beam until COT1 ends.

In a case of switching to the second beam to communicate with the terminal through the second beam, the base station may re-determine a channel occupied time for the channel C2 corresponding to the second beam, such as COT2, so as to occupy the channel C2 corresponding to the second beam until the COT2 ends. Alternatively, the base station may continue to perform occupancy according to COT1, that is, a sum of an occupied duration for the channel C1 corresponding to the first beam before beam switching and an occupied duration for the channel C2 corresponding to the second beam after beam switching is the COT1.

Figure 7:
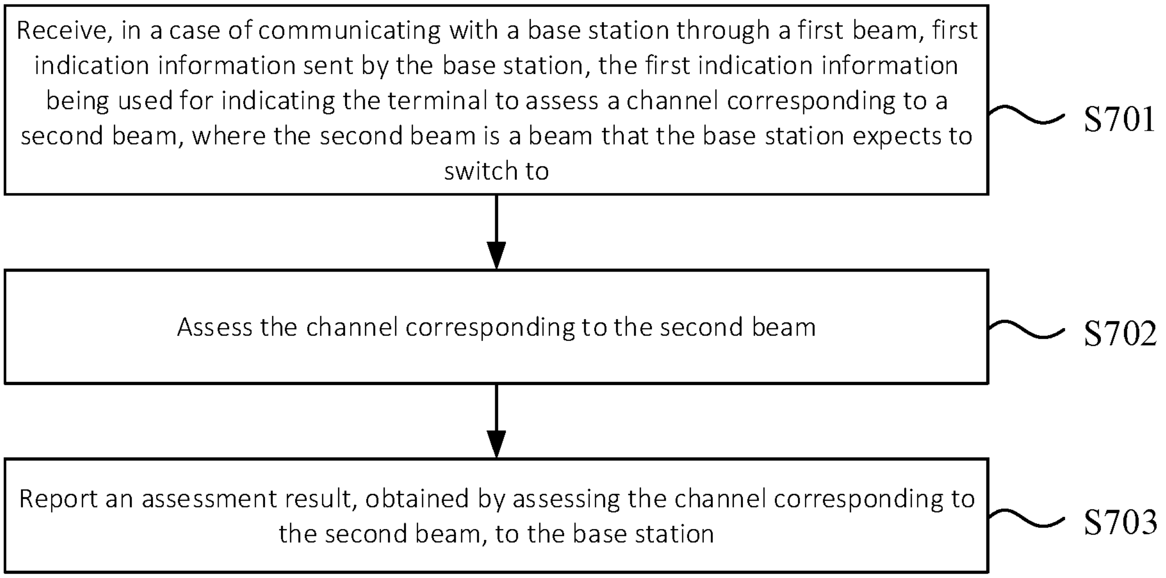
FIG. 7 is a schematic flow chart of an assessing and reporting method according to an example of the disclosure.

FIG. 7 is a schematic flow chart of an assessing and reporting method according to an example of the disclosure. The assessing and reporting method shown in this example may be executed by a terminal. The terminal may communicate with a base station. The terminal includes, but is not limited to a mobile phone, a tablet, a wearable device, a sensor, an Internet of Things device, and other communication devices. The base station includes, but is not limited to base stations in communication systems, such as 4G, 5G and 6G.

In an example, the base station may communicate with the terminal through a beam. A frequency band corresponding to a beam may include a licensed frequency band, and may also include an unlicensed frequency band. The following examples mainly provide an illustrative description of the technical solutions of the disclosure for a scenario of communication between the base station and the terminal through a beam corresponding to the unlicensed frequency band.

As shown in FIG. 7, the assessing and reporting method may include steps S701 to S703.

Step S701 includes receiving, in a case of communicating with a base station through a first beam, first indication information sent by the base station, the first indication information being used for indicating the terminal to assess a channel corresponding to a second beam. The second beam is a beam that the base station expects to switch to.

Step S702 includes assessing the channel corresponding to the second beam.

Step S703 includes reporting an assessment result, obtained by assessing the channel corresponding to the second beam, to the base station.

In an example, the base station may need to perform beam switching during communicating with the terminal through the first beam, such as switching to the second beam for communication. The first beam corresponds to a channel C1, the second beam corresponds to a channel C2, and the channel C1 and the channel C2 may belong to the unlicensed frequency band.

Since the base station may use a beam for communication merely after determining that a channel corresponding to the beam is clear, the base station has been determined that a channel corresponding to the first beam is not occupied when the base station is communicating with the terminal by using the first beam. Thus, the first indication information may be sent to the terminal through the first beam to indicate to the terminal to assess the channel corresponding to the second beam.

As a receiver, the terminal may assess the channel corresponding to the second beam after receiving the first indication information sent by the base station. The assessment way for the channel corresponding to the second beam is explained in subsequent examples. After assessing the channel corresponding to the second beam, the terminal may report the assessment result to the base station, such as reporting the assessment result to the base station through the first beam.

The base station may determine, according to the assessment result, whether to switch to the second beam to communicate with the terminal through the second beam. For example, the base station may determine, according to the assessment result, whether a second channel C2 corresponding to the second beam is occupied. In a case that the second channel C2 is not occupied, that is, the second channel C2 is clear, the base station may indicate to the terminal to switch to the second beam for communication. In a case that the second channel C2 is occupied, the base station may communicate with the terminal by continuing using the first beam.

It is to be noted that, the second beam may be one beam, or a plurality of beams. The base station may indicate to the terminal to assess a channel corresponding to one beam, or indicate to the terminal to assess channels corresponding to the plurality of beams.

For example, in a case that the terminal is indicated to assess a channel corresponding to one second beam, the terminal may report an assessment result for the channel corresponding to this second beam. In a case of determining that the channel is clear according to the assessment result, the base station may indicate to the terminal to switch to this second beam. In a case of determining that the channel is occupied according to the assessment result, the base station does not need to indicate to the terminal to switch to the second beam, but communicates with the terminal by continuing using the first beam.

For example, in a case that the terminal is indicated to assess channels corresponding to a plurality of second beams, the terminal may report assessment results for the channels corresponding to the plurality of second beams, and may further mark the beam corresponding to each assessment result. In a case of determining that at least one of the channels is clear according to the plurality of assessment results, the base station may indicate to the terminal to switch to a second beam corresponding to the clear channel. For example, the base station selects a second beam corresponding to one of the plurality of clear channels according to actual situations and indicates the selected second beam to the terminal. In a case of determining that the channels corresponding to all the second beams are occupied according to the assessment results, the base station does not need to indicate to the terminal to switch to the second beam, but communicates with the terminal by continuing using the first beam.

In an example, reporting the assessment result, obtained by assessing the channel corresponding to the second beam, to the base station includes: reporting the assessment result, through the first beam, to the base station.

In an example, the first indication information is further used for indicating that a beam corresponding to a to-be-assessed channel is the second beam, and/or the method further includes: sending second indication information to the terminal for indicating that the beam corresponding to the to-be-assessed channel is the second beam.

In an example, the base station may trigger, through the first indication information, the terminal to execute an assessment operation, but the channels corresponding to which second beams need to be assessed are also needed to be indicated by the base station. For example, the base station may trigger, through the first indication information, the terminal to execute the assessment operation, and also indicate, through the first indication information, the terminal that the beam corresponding to the to-be-assessed channel is the second beam. Alternatively, the base station may trigger, through the first indication information, the terminal to execute the assessment operation, and indicate, through the second indication information, the terminal that the beam corresponding to the to-be-assessed channel is the second beam.

In an example, the first indication information includes downlink control information (DCI). The second indication information includes at least one of: radio resource control (RRC) signaling, or media access control (MAC) signaling.

In a case of indicating, through the DCI, the terminal that the beam corresponding to the to-be-assessed channel is the second beam, one or more bits in the DCI may be set for indicating a sensing beam that needs to be assessed by the terminal, and the indicated sensing beam is the to-be-assessed second beam. The number of the bits for indicating may be related to the number of candidate beams (which may be pre-agreed). For example, there are four candidate beams, the base station selects one or more of the four candidate beams as the sensing beams, so indication may be performed through two bits to indicate the terminal to assess channels corresponding to the sensing beams. For example, there are two candidate beams, the base station selects one or more of the two candidate beams as the second beam, so indication may be performed through one bit to indicate to the terminal to assess the channel corresponding to the second beam.

In a case of the second indication information being the RRC signaling, there may be an aperiodic trigger state field in the RRC signaling. A beam corresponding to a channel that needs to be assessed by the terminal may be indicated through a QCL parameter in this field. In a case of the second indication information being the MAC signaling, a beam corresponding to a channel that needs to be assessed by the terminal may be indicated through an MAC CE. The number of bits that need to be occupied by the indication information in these two cases is similar to the above examples, so it will not be repeated.

Furthermore, it may further be indicated, through a combination of the first indication information and the second indication information, that the beam corresponding to the to-be-assessed channel is the second beam. For example, the RRC signaling and the DCI are combined to indicate to the terminal that the beam corresponding to the to-be-assessed channel is the second beam. Alternatively, the MAC signaling and the DCI are combined to indicate the terminal that the beam corresponding to the to-be-assessed channel is the second beam. For example, the terminal is first informed of candidate beams or candidate beam combinations through the RRC signaling or the MAC signaling, and then is informed, through the DCI, that a beam or a beam combination in the candidate beams or the candidate beam combinations is the second beam corresponding to the to-be-assessed channel by the terminal.

According to the example of the disclosure, in a case of communicating with the terminal through the first beam and needing to switch to the second beam, the base station can send the indication information to the terminal for indicating the terminal to assess the channel corresponding to the second beam, and the assessment result may be reported, so that whether to switch to the second beam to communicate with the terminal may be determined according to the assessment result, thus facilitating avoidance of a communication problem caused by switching, in a case that the channel corresponding to the second beam is occupied, to the second beam.

In an example, a way of assessing the channel corresponding to the second beam includes at least one of:

measuring layer 1-received signal strength indication (L1-RSSI) of the channel corresponding to the second beam; or performing clear channel assessment (CCA) or enhance clear channel assessment (eCCA) on the channel corresponding to the second beam.

As a receiver communicating at the unlicensed frequency band, the terminal may assess an occupancy situation of the channel corresponding to the second beam that needs to be switched to by measuring the L1-RSSI of the channel corresponding to the second beam, or by performing the CCA or the eCCA on the channel corresponding to the second beam, and this way may be called receiver-assisted CCA or eCCA through existing channels/signals. The following examples mainly provide illustrative explanations for these two ways.

Figure 8:
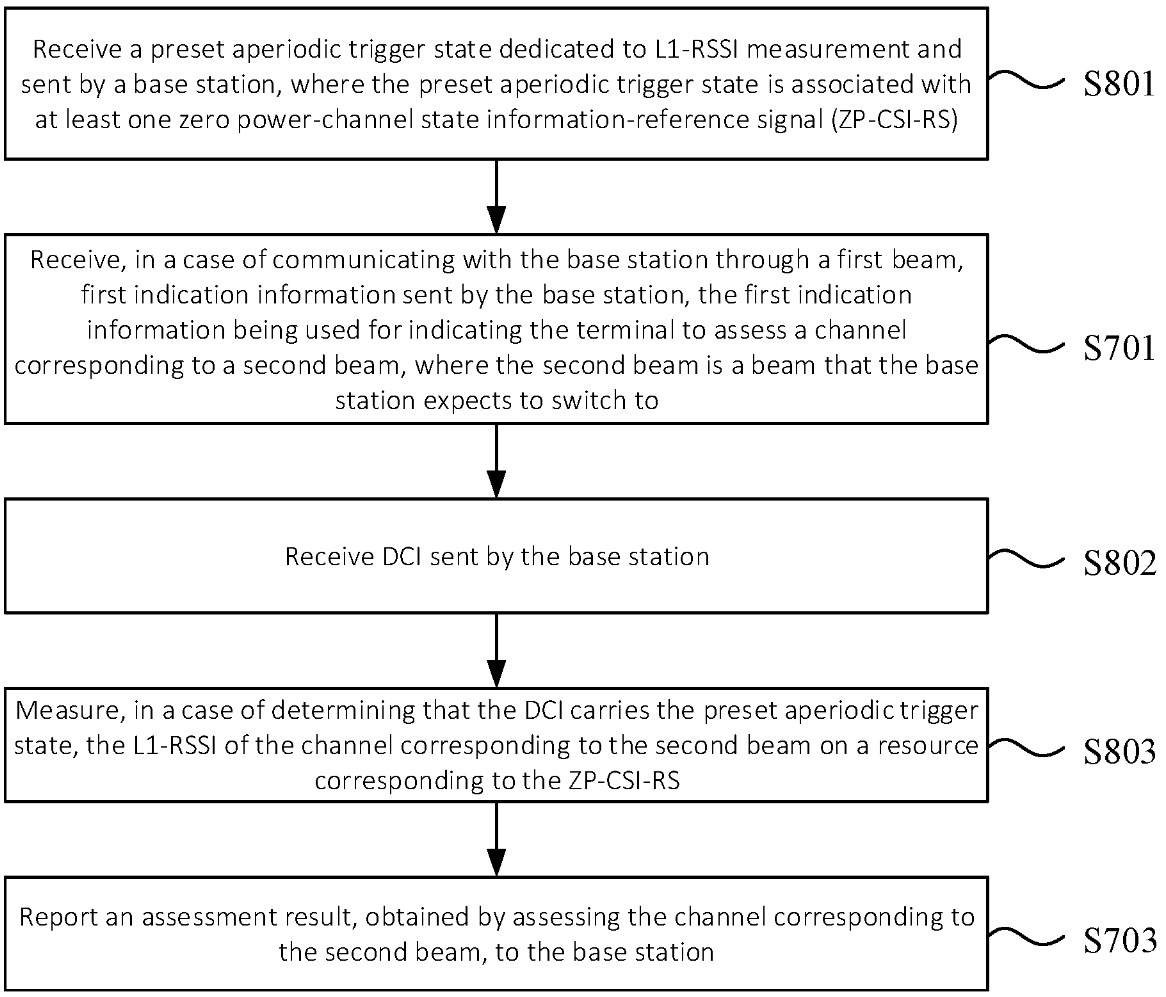
FIG. 8 is a schematic flow chart of another assessing and reporting method according to an example of the disclosure.

FIG. 8 is a schematic flow chart of another assessing and reporting method according to an example of the disclosure. As shown in FIG. 8, the way of assessing the channel corresponding to the second beam includes measuring the L1-RSSI of the channel corresponding to the second beam. The assessing and reporting method further includes steps S801, S802 and S803.

Step S801 includes receiving a preset aperiodic trigger state dedicated to L1-RSSI measurement and sent by the base station. The preset aperiodic trigger state is associated with at least one zero power-channel state information-reference signal (ZP-CSI-RS).

Step S802 includes receiving DCI sent by the base station.

Assessing the channel corresponding to the second beam includes step S803.

Step S803 includes measuring, in a case of determining that the DCI carries the preset aperiodic trigger state, the L1-RSSI of the channel corresponding to the second beam on a resource corresponding to the ZP-CSI-RS.

In an example, the base station may send the preset aperiodic trigger state to the terminal in advance, and the preset aperiodic trigger state is dedicated to the L1-RSSI, for example, the preset aperiodic trigger state may be sent to the terminal through the RRC signaling, and the preset aperiodic trigger state is associated with at least one ZP-CSI-RS.

Thus, in a case of needing to perform beam switching, DCI may be sent to the terminal, and the preset aperiodic trigger state may be carried in the DCI. After receiving the DCI, the terminal may detect a CSI request field in the DCI, in which the aperiodic trigger state is carried. In a case that the aperiodic trigger state in the CSI request field is the preset aperiodic trigger state, the terminal may be triggered to measure the L1-RSSI of the channel corresponding to the second beam on the resource corresponding to the ZP-CSI-RS associated with the preset aperiodic trigger state.

In an example, the DCI includes uplink scheduling DCI. Reporting the assessment result, obtained by assessing the channel corresponding to the second beam, to the base station includes: reporting the assessment result on a PUSCH scheduled by the uplink scheduling DCI.

In an example, the type of the DCI may be DCI format 0_1 or DCI format 0_2, the two types of DCI are uplink scheduling DCI. After obtaining the L1-RSSI by assessing, the terminal may report the L1-RSSI to the base station on an uplink resource scheduled by the DCI. Based on this, the DCI can not only play a role of indication, but also play a role of scheduling, which is conducive to improving the communication efficiency.

Figure 9:
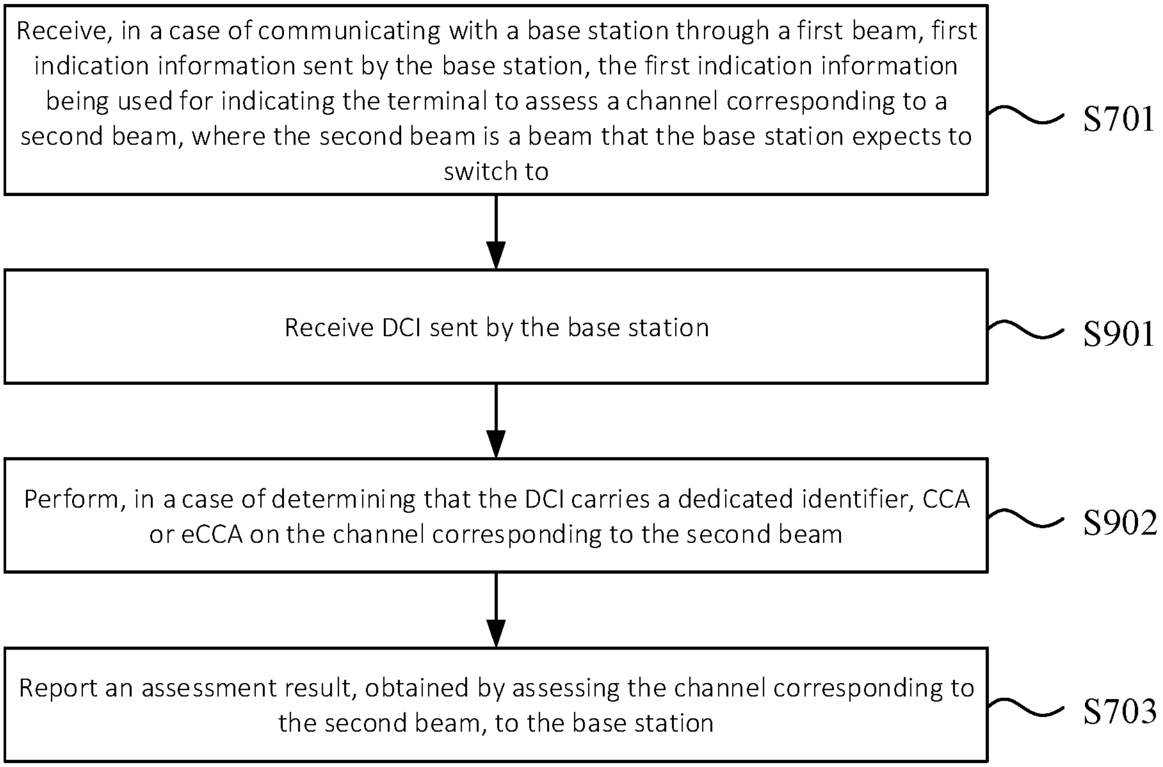
FIG. 9 is a schematic flow chart of yet another assessing and reporting method according to an example of the disclosure.

FIG. 9 is a schematic flow chart of yet another assessing and reporting method according to an example of the disclosure. As shown in FIG. 9, the way of assessing the channel corresponding to the second beam includes performing the CCA or the eCCA on the channel corresponding to the second beam. The assessing and reporting method further includes steps S901 and S902.

Step S901 includes receiving DCI sent by the base station.

Assessing the channel corresponding to the second beam includes step S902.

Step S902 includes performing, in a case of determining that the DCI carries a dedicated identifier, the CCA or the eCCA on the channel corresponding to the second beam.

In an example, the base station sends the DCI carrying the dedicated identifier to the terminal to instruct the terminal to perform the CCA or the eCCA on the channel corresponding to the second beam.

The base station may send a plurality of pieces of DCI to the terminal during communication with the terminal. Different pieces of DCI may have different roles. For example, the base station may send the DCI to the terminal for routine scheduling. Alternatively, the base station may send the DCI to the terminal to indicate COT for the channel corresponding to the first beam. Thus, in order to indicate, through the DCI, the terminal to perform the CCA or the eCCA on the channel corresponding to the second beam, the dedicated identifier may be added into the DCI. After receiving the DCI, the terminal may determine, in a case of determining that there is the dedicated identifier in the DCI, that the DCI is at least used for indicating the terminal to perform the CCA or the eCCA on the channel corresponding to the second beam.

In an example, the DCI includes at least one of the uplink scheduling DCI or the downlink scheduling DCI. Reporting the assessment result, obtained by assessing the channel corresponding to the second beam, to the base station includes at least one of: reporting the assessment result on a PUSCH scheduled by the uplink scheduling DCI; or reporting the assessment result on a physical uplink control channel (PUCCH) corresponding to an HARQ, where the HARQ corresponding to a PDSCH scheduled by the downlink scheduling DCI.

In an example, the DCI may be the downlink scheduling DCI, or the uplink scheduling DCI.

Taking the uplink scheduling DCI as an example, after obtaining the assessment result by performing the CCA or the eCCA on the channel corresponding to the second beam, the terminal may report a result of the CCA or the eCCA to the base station on an uplink resource scheduled by the DCI.

Taking the downlink scheduling DCI as an example, after obtaining the assessment result by performing the CCA or the eCCA on the channel corresponding to the second beam, the terminal may determine the PDSCH scheduled by the DCI so as to determine the PUCCH for transmitting the HARQ corresponding to the PDSCH, so that the result of the CCA or the eCCA may be reported to the base station on the determined PUCCH.

Corresponding to the examples of the beam switching methods and the assessing and reporting methods mentioned above, the disclosure further provides examples of a beam switching apparatus and an assessing and reporting apparatus.

An example of the disclosure further provides a beam switching apparatus. The beam switching apparatus may be applicable to a base station. The base station may communicate with a terminal. The terminal includes, but is not limited to a mobile phone, a tablet, a wearable device, a sensor, an Internet of Things device, and other communication devices. The base station includes, but is not limited to base stations in communication systems, such as 4G, 5G and 6G.

In an example, the base station may communicate with the terminal through a beam. A frequency band corresponding to a beam may include a licensed frequency band, and may also include an unlicensed frequency band. The following examples provide an illustrative description of the technical solutions of the disclosure for a scenario of communication between the base station and the terminal through a beam corresponding to the unlicensed frequency band.

In an example, the beam switching apparatus includes one or more processors. The one or more processors are collectively configured to: send, in a case of communicating with a terminal through a first beam and needing to switch to a second beam, first indication information to the terminal for indicating the terminal to assess a channel corresponding to the second beam; receive an assessment result, reported by the terminal, for the channel corresponding to the second beam; and determine, according to the assessment result, whether to switch to the second beam to communicate, through the second beam, with the terminal.

In an example, a way of assessing the channel corresponding to the second beam includes at least one of: measuring layer 1-received signal strength indication (L1-RSSI) of the channel corresponding to the second beam; or performing clear channel assessment (CCA) or enhance clear channel assessment (eCCA) on the channel corresponding to the second beam.

In an example, the way of assessing the channel corresponding to the second beam includes measuring the L1-RSSI of the channel corresponding to the second beam. The one or more processors are further collectively configured to: send, to the terminal, a preset aperiodic trigger state dedicated to L1-RSSI measurement, where the preset aperiodic trigger state is associated with at least one zero power-channel state information-reference signal (ZP-CSI-RS); and send downlink control information (DCI) to the terminal, the DCI carrying the preset aperiodic trigger state for triggering the terminal to measure the L1-RSSI of the channel corresponding to the second beam on a resource corresponding to the ZP-CSI-RS.

In an example, the DCI includes uplink scheduling DCI. The uplink scheduling DCI is further used for indicating the terminal to report the assessment result through a physical uplink shared channel (PUSCH) scheduled by the uplink scheduling DCI.

In an example, one or more processors are collectively configured to: determine that the channel corresponding to the second beam is occupied and communicate with the terminal by continuing using the first beam, in a case of the L1-RSSI being greater than a first threshold; and determine that the channel corresponding to the second beam is clear and switch to the second beam to communicate with the terminal, in a case of the L1-RSSI being smaller than a second threshold.

In an example, the way of assessing the channel corresponding to the second beam includes performing CCA or eCCA on the channel corresponding to the second beam. The one or more processors are further collectively configured to: send DCI to the terminal, the DCI carrying a dedicated identifier for indicating the terminal to perform the CCA or the eCCA on the channel corresponding to the second beam.

In an example, the DCI includes at least one of the uplink scheduling DCI or the downlink scheduling DCI.

The uplink scheduling DCI is further used for indicating the terminal to report the assessment result through a PUSCH scheduled by the uplink scheduling DCI.

The downlink scheduling DCI is further used for instructing the terminal to report the assessment result through a physical uplink control channel (PUCCH) corresponding to a hybrid automatic repeat request (HARQ), where the HARQ corresponds to a physical downlink shared channel (PDSCH) scheduled by the downlink scheduling DCI.

In an example, the one or more processors are collectively configured to: communicate, in a case that a result of the CCA or the eCCA is the channel corresponding to the second beam being occupied, with the terminal by continuing using the first beam; and switch, in a case that the result of the CCA or the eCCA is the channel corresponding to the second beam being clear, to the second beam to communicate with the terminal.

In an example, the first indication information is further used for indicating that a beam corresponding to a to-be-assessed channel is the second beam, and/or the one or more processors are collectively further configured to: send second indication information to the terminal for indicating that the beam corresponding to the to-be-assessed channel is the second beam.

An example of the disclosure further provides an assessing and reporting apparatus. The assessing and reporting apparatus may be applicable to a terminal. The terminal may communicate with a base station. The terminal includes, but is not limited to, a mobile phone, a tablet, a wearable device, a sensor, an Internet of Things device, and other communication devices. The base station includes, but is not limited to, base stations in communication systems, such as 4G, 5G, and 6G.

In an example, the base station may communicate with the terminal through a beam. A frequency band corresponding to a beam may include a licensed frequency band, and may also include an unlicensed frequency band. The following examples mainly provide an illustrative description of the technical solutions of the disclosure for a scenario of communication between the base station and the terminal through a beam corresponding to the unlicensed frequency band.

In an example, the assessing and reporting apparatus includes one or more processors. The one or more processors are collectively configured to: receive, in a case of communicating with a base station through a first beam, first indication information sent by the base station, the first indication information being used for indicating the terminal to assess a channel corresponding to a second beam. The second beam is a beam that the base station expects to switch to; assess the channel corresponding to the second beam; and report an assessment result, obtained by assessing the channel corresponding to the second beam, to the base station.

In an example, the one or more processors are collectively configured to: report the assessment result, through the first beam, to the base station.

In an example, a way of assessing the channel corresponding to the second beam includes at least one of: measuring layer 1-received signal strength indication (L1-RSSI) of the channel corresponding to the second beam; or performing clear channel assessment (CCA) or enhance clear channel assessment (eCCA) on the channel corresponding to the second beam.

In an example, the way of assessing the channel corresponding to the second beam includes measuring the L1-RSSI of the channel corresponding to the second beam. The one or more processors are further collectively configured to: receive a preset aperiodic trigger state dedicated to L1-RSSI measurement and sent by the base station, where the preset aperiodic trigger state is associated with at least one zero power-channel state information-reference signal (ZP-CSI-RS); and receive DCI sent by the base station.

The one or more processors are collectively configured to: measure, in a case of determining that the DCI carries the preset aperiodic trigger state, the L1-RSSI of the channel corresponding to the second beam on a resource corresponding to the ZP-CSI-RS.

In an example, the DCI includes uplink scheduling DCI. The one or more processors are collectively configured to: report the assessment result on a PUSCH scheduled by the uplink scheduling DCI.

In an example, the way of assessing the channel corresponding to the second beam includes performing the CCA or the eCCA on the channel corresponding to the second beam. The one or more processors are further collectively configured to: receive DCI sent by the base station.

The one or more processors are further collectively configured to: perform, in a case of determining that the DCI carries a dedicated identifier, the CCA or the eCCA on the channel corresponding to the second beam.

In an example, the DCI includes at least one of the uplink scheduling DCI or the downlink scheduling DCI. The one or more processors are further collectively configured to execute at least one of: reporting the assessment result on a PUSCH scheduled by the uplink scheduling DCI; or reporting the assessment result on a physical uplink control channel (PUCCH) corresponding to an HARQ, where the HARQ corresponds to a PDSCH scheduled by the downlink scheduling DCI.

In an example, the one or more processors are further collectively configured to execute at least one of: determining, according to the first indication information, that a beam corresponding to a to-be-assessed channel is the second beam; or, determining, according to second indication information sent by the base station, that the beam corresponding to the to-be-assessed channel is the second beam.

As for the apparatuses in the above examples, the manner in which each module performs operations has been described in detail in the examples of the related methods, and detailed description will not be given.

As for the apparatus examples, since they basically correspond to the method examples, please refer to the partial description of the method examples for the relevant parts. The apparatus examples described above are illustrative. The modules described as separate components may or may not be physically separated, and the components displayed as modules may or may not be physical modules, that is, they may be located in one place, or may be distributed to multiple network modules. Some or all of the modules may be selected according to actual needs to realize the objectives of the solutions of the examples. Those ordinary skilled in the art may understand and implement it without creative labor.

An example of the disclosure further provides a communication device, including: one or more processors; and a memory, configured to store a computer program. The computer program, when collectively executed by the one or more processors, implements the beam switching method described in any of the above examples.

An example of the disclosure further provides a communication device, including: one or more processors; and a memory, configured to store a computer program. The computer program, when collectively executed by the one or more processors, implements the assessing and reporting method described in any of the above examples.

An example of the disclosure further provides a non-transitory computer-readable storage medium, configured to store a computer program. The computer program, when collectively executed by one or more processors, implements steps in the beam switching method described in any of the above examples.

An example of the disclosure further provides a non-transitory computer-readable storage medium, configured to store a computer program. The computer program, when collectively executed by one or more processors, implements steps in the assessing and reporting method described in any of the above examples.

Figure 10:
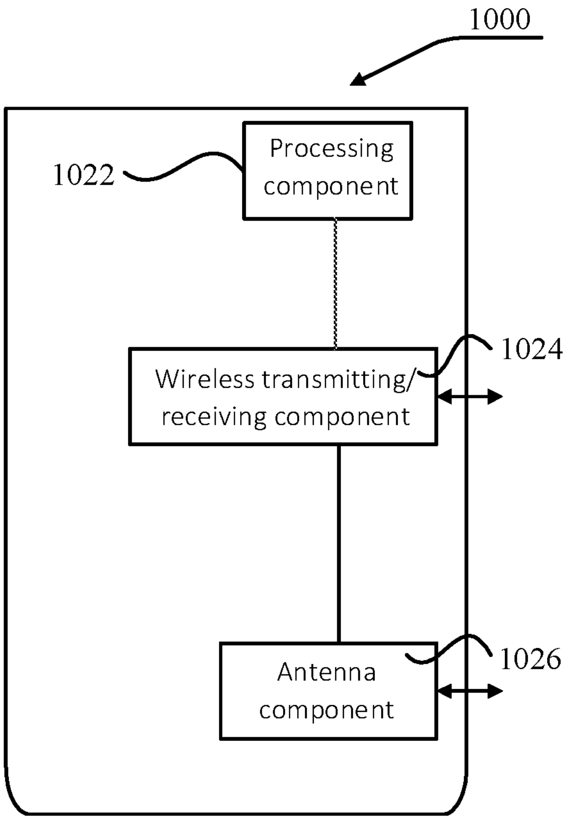
FIG. 10 is a schematic block diagram of an apparatus for beam switching according to an example of the disclosure.

As shown in FIG. 10, FIG. 10 is a schematic block diagram of an apparatus 1000 for beam switching according to an example of the disclosure. The apparatus 1000 may be provided as a base station. Referring to FIG. 10, the apparatus 1000 includes a processing component 1022, a wireless transmitting/receiving component 1024, an antenna component 1026, and a signal processing part specific to a wireless interface. The processing component 1022 may further include one or more processors. One or more processors in the processing component 1022 may be configured to implement the beam switching method described in any of the above examples.

Figure 11:
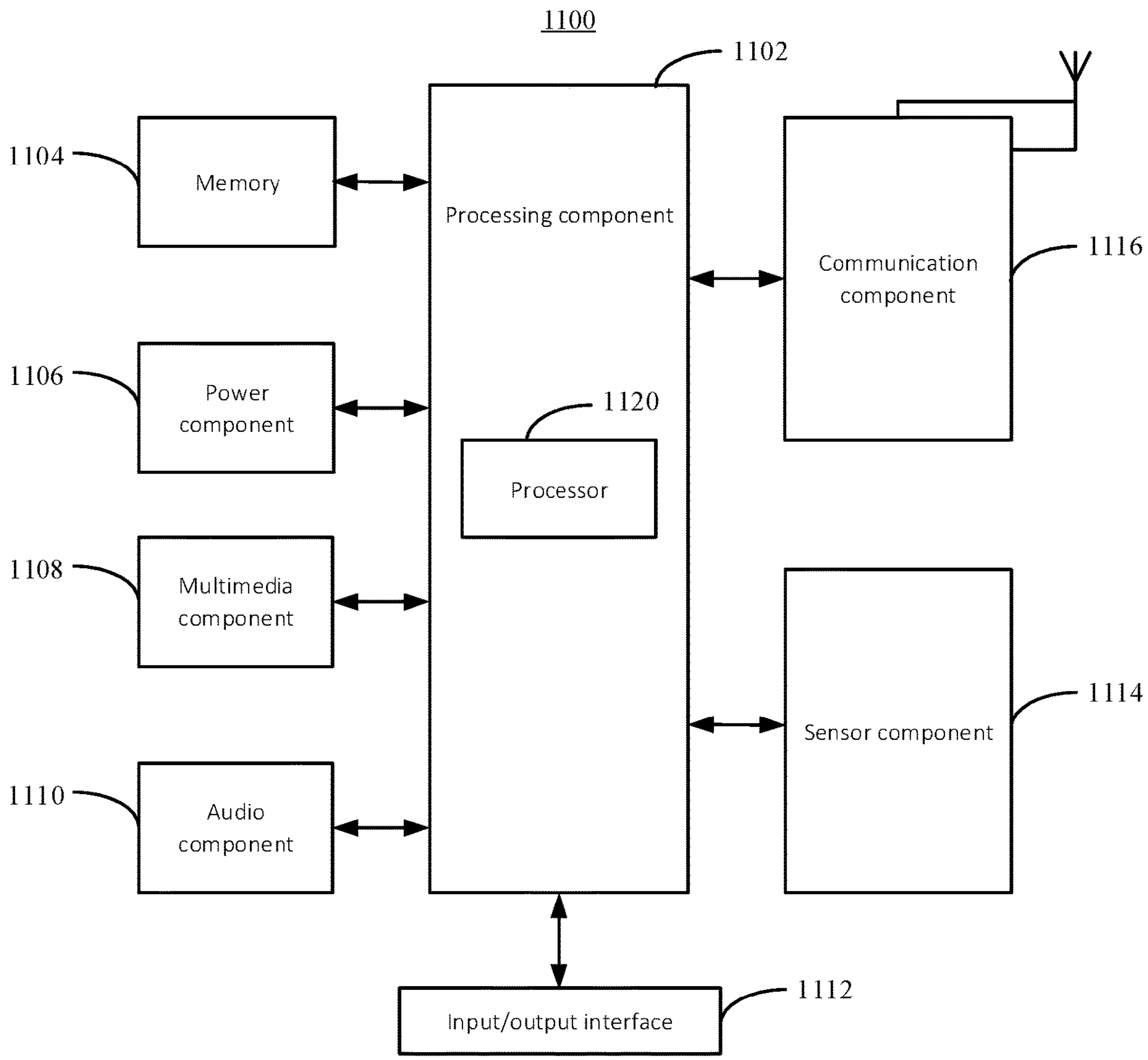
FIG. 11 is a schematic block diagram of an apparatus for assessing and reporting according to an example of the disclosure.

FIG. 11 is a schematic block diagram of an apparatus 1100 for assessing and reporting according to an example of the disclosure. For example, the apparatus 1100 may be a mobile phone, a computer, a digital broadcasting terminal, a messaging device, a game console, a tablet device, a medical device, a fitness device, a personal digital assistant, etc.

Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls an overall operation of the apparatus 1100, such as operations associated with display, telephone call, data communication, camera operations, and recording operations. The processing component 1102 may include one or more processors 1120 to execute instructions to complete all or part of the steps of the above assessing and reporting method. In addition, the processing component 1102 may include one or more modules to facilitate interaction between the processing component 1102 and other components. For example, the processing component 1102 may include a multimedia module to facilitate interaction between the multimedia component 1108 and the processing component 1102.

The memory 1104 is configured to store various types of data to support operations on the apparatus 1100. Instances of these data include instructions for any application or method operating on the apparatus 1100, contact data, phonebook data, messages, pictures, videos, etc. The memory 1104 may be implemented by any type of volatile or nonvolatile storage device or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optic disk.

The power component 1106 provides power for various components of the apparatus 1100. The power component 1106 may include a power management system, one or more power sources, and other components associated with generating, managing and distributing power for the apparatus 1100.

The multimedia component 1108 includes a screen providing an output interface between the apparatus 1100 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding, and gestures on the touch panel. The touch sensor may not merely sense the boundary of the touch or sliding operation, but also detect the duration and pressure related to the touch or sliding operation. In some examples, the multimedia component 1108 includes a front camera and/or a rear camera. When the apparatus 1100 is in an operation mode, such as a shooting mode or a video mode, the front camera and/or the rear camera can receive external multimedia data. Each front camera and each rear camera can be a fixed optical lens system or have a focal length and optical zoom capability.

The audio component 1110 is configured to output and/or input audio signals. For example, the audio component 1110 includes a microphone (MIC) configured to receive an external audio signal when the apparatus 1100 is in the operation mode, such as a call mode, a recording mode, and a speech recognition mode. The received audio signal may be further stored in the memory 1104 or transmitted via the communication component 1116. In some examples, the audio component 1110 further includes a speaker for outputting an audio signal.

The I/O interface 1112 provides an interface between the processing component 1102 and a peripheral interface module, which may be a keyboard, a click wheel, a button, etc. These buttons may include, but are not limited to: a home button, volume buttons, a start button and a lock button.

The sensor component 1114 includes one or more sensors for providing state assessment of various aspects of the apparatus 1100. For example, the sensor component 1114 can detect an on/off state of the apparatus 1100 and the relative positioning of the components, for example, the component is a display and a keypad of the apparatus 1100. The sensor component 1114 can also detect the change of the position of the apparatus 1100 or one component of the apparatus 1100, the presence or absence of user contact with the apparatus 1100, the azimuth or acceleration/deceleration of the apparatus 1100, and temperature change of the apparatus 1100. The sensor component 1114 may include a proximity sensor configured to detect the presence of nearby objects without any physical contact. The sensor component 1114 may further include an optical sensor, such as a CMOS or CCD image sensor, for use in imaging applications. In some examples, the sensor component 1114 may further include an acceleration sensor, a gyroscope sensor, a magnetic sensor, a pressure sensor, or a temperature sensor.

The communication component 1116 is configured to facilitate wired or wireless communication between the apparatus 1100 and other devices. The apparatus 1100 may access a wireless network based on a communication standard, such as WiFi, 2G, 3G, 4G LTE, 5G NR, or their combination. In an example, the communication component 1116 receives a broadcast signal or broadcast-related information from an external broadcast management system via a broadcast channel. In an example, the communication component 1116 further includes a near field communication (NFC) module to facilitate short-range communication. For example, the NFC module may be implemented based on a radio frequency identification (RFID) technology, an infrared data association (IrDA) technology, an ultra wideband (UWB) technology, a Bluetooth (BT) technology, and other technologies.

In an example, the apparatus 1100 may be implemented by one or more of an application-specific integrated circuits (ASIC), a digital signal processor (DSP), a digital signal processing device (DSPD), a programmable logic device (PLD), a field programmable gate array (FPGA), a controller, a microcontroller, a microprocessor, or other electronic element for performing the above assessing and reporting method.

In an example, a non-transitory computer-readable storage medium is further provided, including instructions, such as the memory 1104, which may be executed by the processor 1120 of the apparatus 1100 to complete the above assessing and reporting method. For example, the non-transitory computer-readable storage medium may be an ROM, a random access memory (RAM), a CD-ROM, a magnetic tape, a floppy disk, an optical data storage device, etc.

According to the examples of the disclosure, in a case of communicating with the terminal through the first beam and needing to switch to the second beam, the base station can send the first indication information to the terminal for indicating the terminal to assess the channel corresponding to the second beam, and the assessment result may be reported, so that whether to switch to the second beam to communicate with the terminal may be determined according to the assessment result, thus facilitating avoidance of a communication problem caused by switching, in a case that the channel corresponding to the second beam is occupied, to the second beam.

Other implementations of the disclosure will be apparent to those skilled in the art from consideration of the specification and practice of the disclosure. The disclosure is intended to cover any variations, uses, or adaptations of the disclosure following the general principles of the disclosure and including such departures from the disclosure as come within known or customary practice in the art. The specification and examples are considered as instances, and the true scope and spirit of the disclosure are indicated by the following claims.

It is to be understood that the disclosure is not limited to the exact structure that has been described above and illustrated in the accompanying drawings, and various modifications and changes may be made without departing from its scope. It is intended that the scope of the disclosure is limited by the appended claims.

It is to be noted that relational terms such as first and second are used to distinguish one entity or operation from another entity or operation, and do not necessarily require or imply any such actual relationship or order between these entities or operations. The terms "include", "comprise" or any other variants are intended to cover non-exclusive inclusion, so that a process, method, article, or device including a series of elements not merely includes those elements, but also includes other elements not clearly listed, or also includes elements inherent to this process, method, article, or device. Without further restrictions, the elements defined by the statement "including one . . . " do not exclude that there are other identical elements in the process, method, article, or device, including the elements.

The methods and apparatuses provided by the examples of the disclosure are described in detail above. Instances are used to describe the principle and implementation of the disclosure. The description of the above examples is used to help understand the method and core idea of the disclosure. At the same time, for those ordinary skilled in the art, according to the idea of the disclosure, there will be changes in the specific implementations and scope of application. To sum up, the content of the specification should not be interpreted as a restriction on the disclosure.

The invention claimed is:

1. A beam switching method, performed by a base station, comprising:

sending, in a case of communicating with a terminal through a first beam and needing to switch to a second beam, first indication information to the terminal, wherein the first indication information is configured to instruct the terminal to assess a channel corresponding to the second beam, the first indication information is carried in downlink control information (DCI), the DCI comprises downlink scheduling DCI, and the downlink scheduling DCI is configured to instruct the terminal to report an assessment result for the channel corresponding to the second beam through a physical uplink control channel (PUCCH) corresponding to a hybrid automatic repeat request (HARQ) corresponding to a physical downlink shared channel (PDSCH) scheduled by the downlink scheduling DCI;

receiving the assessment result, reported by the terminal, for the channel corresponding to the second beam; and determining, according to the assessment result, whether to switch to the second beam to communicate, through the second beam, with the terminal.

2. The beam switching method according to claim 1, wherein a way of assessing the channel corresponding to the second beam comprises at least one of:

measuring layer 1-received signal strength indication (L1-RSSI) of the channel corresponding to the second beam; or performing clear channel assessment (CCA) or enhance clear channel assessment (eCCA) on the channel corresponding to the second beam.

3. The beam switching method according to claim 2, wherein the way of assessing the channel corresponding to the second beam comprises measuring the L1-RSSI of the channel corresponding to the second beam, and the method further comprises:

sending a preset aperiodic trigger state dedicated to L1-RSSI measurement to the terminal, wherein the preset aperiodic trigger state is associated with at least one zero power-channel state information-reference signal (ZP-CSI-RS);

wherein sending the first indication information to the terminal comprises:

sending uplink scheduling DCI to the terminal, wherein the uplink scheduling DCI carrying carries the preset aperiodic trigger state for triggering the terminal to measure the L1-RSSI of the channel corresponding to the second beam on a resource corresponding to the ZP-CSI-RS.

4. The beam switching method according to claim 3, wherein determining, according to the assessment result, whether to switch to the second beam to communicate, through the second beam, with the terminal comprises:

determining that the channel corresponding to the second beam is occupied and communicating with the terminal by continuing using the first beam, in a case of the L1-RSSI being greater than a first threshold; and determining that the channel corresponding to the second beam is clear and switching to the second beam to communicate, through the second beam, with the terminal, in a case of the L1-RSSI being smaller than a second threshold.

5. The beam switching method according to claim 2, wherein the way of assessing the channel corresponding to the second beam comprises performing the CCA or the eCCA on the channel corresponding to the second beam; wherein sending the first indication information to the terminal comprises:

sending the downlink scheduling DCI to the terminal, wherein the downlink scheduling DCI carries a dedicated identifier for instructing the terminal to perform the CCA or the eCCA on the channel corresponding to the second beam.

6. The beam switching method according to claim 5, wherein determining, according to the assessment result, whether to switch to the second beam to communicate, through the second beam, with the terminal comprises:

communicating, in a case that a result of the CCA or the eCCA is the channel corresponding to the second beam being occupied, with the terminal by continuing using the first beam; and switching, in a case that the result of the CCA or the eCCA is the channel corresponding to the second beam being clear, to the second beam to communicate, through the second beam, with the terminal.

7. The beam switching method according to claim 1, wherein the first indication information is further used for indicating that a beam corresponding to a to-be-assessed channel is the second beam, and/or the method further comprises:

sending second indication information to the terminal for indicating that the beam corresponding to the to-be-assessed channel is the second beam.

8. A non-transitory computer readable storage medium, configured to store a computer program, wherein the computer program, when collectively executed by one or more processors of a communication device, causes the communication device to perform the beam switching method according to claim 1.

9. An assessing and reporting method, performed by a terminal, and comprising:

receiving, in a case of communicating with a base station through a first beam, first indication information sent by the base station, wherein the first indication information being used for instructing the terminal to assess a channel corresponding to a second beam, wherein the second beam is a beam that the base station expects to switch to, the first indication information is carried in downlink control information (DCI), the DCI comprises downlink scheduling DCI, and the downlink scheduling DCI is configured to instruct the terminal to report an assessment result for the channel corresponding to the second beam through a physical uplink control channel (PUCCH) corresponding to a hybrid automatic repeat request (HARQ) corresponding to a physical downlink shared channel (PDSCH) scheduled by the downlink scheduling DCI;

assessing the channel corresponding to the second beam; and reporting the assessment result, obtained by assessing the channel corresponding to the second beam, to the base station.

10. The assessing and reporting method according to claim 9, wherein reporting the assessment result, obtained by assessing the channel corresponding to the second beam, to the base station comprises:

reporting the assessment result, through the first beam, to the base station.

11. The assessing and reporting method according to claim 9, wherein a way of assessing the channel corresponding to the second beam comprises at least one of:

measuring layer 1-received signal strength indication (L1-RSSI) of the channel corresponding to the second beam; or performing clear channel assessment (CCA) or enhance clear channel assessment (eCCA) on the channel corresponding to the second beam.

12. The assessing and reporting method according to claim 11, wherein the way of assessing the channel corresponding to the second beam comprises measuring the L1-RSSI of the channel corresponding to the second beam, and the method further comprises:

receiving a preset aperiodic trigger state dedicated to L1-RSSI measurement and sent by the base station, wherein the preset aperiodic trigger state is associated with at least one zero power-channel state information-reference signal (ZP-CSI-RS); and receiving uplink scheduling DCI sent by the base station;

wherein assessing the channel corresponding to the second beam comprises:

measuring, in a case of determining that the uplink scheduling DCI carries the preset aperiodic trigger state, the L1-RSSI of the channel corresponding to the second beam on a resource corresponding to the ZP-CSI-RS.

13. The assessing and reporting method according to claim 11, wherein the way of assessing the channel corresponding to the second beam comprises performing the CCA or the eCCA on the channel corresponding to the second beam, and the method further comprises:

receiving the downlink scheduling DCI sent by the base station;

wherein assessing the channel corresponding to the second beam comprises:

performing, in a case of determining that the downlink scheduling DCI carries a dedicated identifier, the CCA or the eCCA on the channel corresponding to the second beam.

14. The assessing and reporting method according to claim 9, further comprising at least one of:

determining, according to the first indication information, that a beam corresponding to a to-be-assessed channel is the second beam; or determining, according to second indication information sent by the base station, that the beam corresponding to the to-be-assessed channel is the second beam.

15. A communication device, comprising:

one or more processors; and a memory, configured to store a computer program;

wherein, the computer program, when executed by the one or more processors, causes the communication device to collectively perform the assessing and reporting method according to claim 9.

16. A communication device, comprising:

one or more processors; and a memory, configured to store a computer program;

wherein the computer program, when collectively executed by the one or more processors, causes the communication device to:

send, in a case of communicating with a terminal through a first beam and needing to switch to a second beam, first indication information to the terminal, wherein the first indication information is configured to instruct the terminal to assess a channel corresponding to the second beam, the first indication information is carried in downlink control information (DCI), the DCI comprises downlink scheduling DCI, and the downlink scheduling DCI is configured to instruct the terminal to report an assessment result for the channel corresponding to the second beam through a physical uplink control channel (PUCCH) corresponding to a hybrid automatic repeat request (HARQ) corresponding to a physical downlink shared channel (PDSCH) scheduled by the downlink scheduling DCI;

receive the assessment result, reported by the terminal, for the channel corresponding to the second beam; and determine, according to the assessment result, whether to switch to the second beam to communicate, through the second beam, with the terminal.

* * * * *